(12) United States Patent
Miyauchi et al.

(10) Patent No.: US 11,181,856 B2
(45) Date of Patent: *Nov. 23, 2021

(54) FIXING MEMBER, FIXING DEVICE, AND ELECTROPHOTOGRAPHIC IMAGE-FORMING APPARATUS

(71) Applicant: CANON KABUSHIKI KAISHA, Tokyo (JP)

(72) Inventors: Yohei Miyauchi, Tokyo (JP); Yasuharu Notoya, Tokyo (JP); Kimihiro Yoshimura, Kashiwa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/021,241

(22) Filed: Sep. 15, 2020

(65) Prior Publication Data

US 2021/0003953 A1 Jan. 7, 2021

Related U.S. Application Data

(63) Continuation of application No. PCT/JP2019/010950, filed on Mar. 15, 2019.

(30) Foreign Application Priority Data

Mar. 22, 2018 (JP) .............................. JP2018-055190
Mar. 22, 2018 (JP) .............................. JP2018-055191

(Continued)

(51) Int. Cl.
*G03G 15/20* (2006.01)
*G03G 15/16* (2006.01)

(52) U.S. Cl.
CPC ....... *G03G 15/2057* (2013.01); *G03G 15/162* (2013.01); *G03G 15/206* (2013.01); *G03G 15/2064* (2013.01)

(58) Field of Classification Search
CPC .................................................. G03G 15/2057
See application file for complete search history.

(56) References Cited

U.S. PATENT DOCUMENTS 6,895,206 B2 5/2005 Nakamura et al.
9,250,546 B2 2/2016 Kameyama et al.
(Continued)

FOREIGN PATENT DOCUMENTS

JP 9-096981 A 4/1997
JP 2000-19879 A 1/2000
(Continued)

OTHER PUBLICATIONS

JP 2015-212810, U.S. Pat No. 9,575,439 B2.
(Continued)

*Primary Examiner* — Arlene Heredia
(74) *Attorney, Agent, or Firm* — Venable LLP

(57) ABSTRACT

Provided is a fixing member for electrophotography having excellent toner releasability even when used for a long time period. The fixing member includes a base layer, an elastic layer, and a surface layer in the stated order. The surface layer contains a fluorine resin and a fluorine oil having a perfluoropolyether structure. The mass P11 of an adhered substance including the fluorine oil, adhered in the unit area of the detection surface of a QCM sensor when a measurement sample collected from the surface layer is subjected to a predetermined treatment (i), is $1.0 \times 10^2$ ng or more and $1.0 \times 10^4$ ng or less, and the mass P12 of an adhered substance including the fluorine oil, adhered in the unit area of the detection surface of the QCM sensor when the sample is subjected to a predetermined treatment (ii), is $0.5 \times P11$ or more and $1.2 \times P11$ or less.

14 Claims, 5 Drawing Sheets

(30) Foreign Application Priority Data

| Feb. 20, 2019 | (JP) | JP2019-028560 |
| Feb. 20, 2019 | (JP) | JP2019-028564 |
| Feb. 25, 2019 | (JP) | JP2019-031637 |

(56) References Cited

U.S. PATENT DOCUMENTS

| 9,575,439 B2 | 2/2017 | Tsuji |
| 10,739,712 B2 | 8/2020 | Miyauchi et al. |
| 10,983,466 B2 * | 4/2021 | Miyauchi ............... B32B 7/12 |
| 2012/0122049 A1 * | 5/2012 | Kanamori ............. F24V 99/00 432/92 |
| 2014/0321893 A1 | 10/2014 | Qi et al. |
| 2020/0409294 A1 | 12/2020 | Miyauchi et al. |

FOREIGN PATENT DOCUMENTS

| JP | 2003-029484 A | 1/2003 |
| JP | 2004-053847 A | 2/2004 |
| JP | 2015-028613 A | 2/2015 |
| JP | 2015-212810 A | 11/2015 |
| JP | 2018-001109 A | 1/2018 |
| JP | 2018-22056 A | 2/2018 |
| JP | 2018-180488 A | 11/2018 |
| WO | 2019/181805 A1 | 9/2019 |

OTHER PUBLICATIONS

JP 2004-053847, U.S. Pat. No. 6,895,206 B2.
JP 2015-028613, U.S. Pat. No. 9,250,546 B2.
Y. Kitazaki et al.., "Extended Fowkes' Equation and Evaluation of Surface Tension of Polymer Solid," 8(3) Journal of the Adhesion Society of Japan 131-141 (1972).
International Search Report in International Application No. PCT/JP2019/010950 (dated Apr. 2019).
International Preliminary Report on Patentability in International Application No. PCT/JP2019/010950 (dated Oct. 2020).

* cited by examiner

FIXING MEMBER, FIXING DEVICE, AND ELECTROPHOTOGRAPHIC IMAGE-FORMING APPARATUS

CROSS-REFERENCE TO RELATED APPLICATIONS

This application is a Continuation of International Patent Application No. PCT/JP2019/010950, filed Mar. 15, 2019, which claims the benefit of Japanese Patent Application No. 2018-055190, filed Mar. 22, 2018, Japanese Patent Application No. 2018-055191, filed Mar. 22, 2018, Japanese Patent Application No. 2019-028564, filed Feb. 20, 2019, Japanese Patent Application No. 2019-028560, filed Feb. 20, 2019, and Japanese Patent Application No. 2019-031637, filed Feb. 25, 2019, each of which is hereby incorporated by reference herein in its entirety.

BACKGROUND

Field

The present disclosure relates to a fixing member, a fixing device, and an electrophotographic image-forming apparatus.

Description of the Related Art

In a fixing device to be used in an electrophotographic image-forming apparatus (hereinafter sometimes referred to as "image-forming apparatus"), such as a copying machine or a laser printer, rotating bodies that are heated and form a pair, such as a roller and another roller, a film and a roller, a belt and a roller, or a belt and another belt, are brought into press contact with each other. In addition, a recording medium, such as paper, holding an image formed with unfixed toner is introduced into a press contact site (hereinafter referred to as "fixing nip portion") formed between the rotating bodies, and the unfixed toner is heated and melted to fix the image to the recording medium. A rotating body with which an unfixed toner image on the recording medium is brought into contact is referred to as "fixing member", and the member is called a fixing roller, a fixing film, or a fixing belt in accordance with its shape.

In a fixing member for electrophotography, as a surface layer for forming an outer surface to be brought into contact with toner (hereinafter referred to as "surface layer"), to suppress the adhesion of the toner, there may be used a surface layer containing a fluorine resin, specifically, for example, a copolymer of tetrafluoroethylene ($-C_2F_4-$) and a perfluoroalkyl vinyl ether ($-CF_2-CF(ORf)-$) (hereinafter sometimes referred to as "PFA"). Herein, the symbol "Rf" represents a perfluoroalkyl group.

In recent years, the diversification of paper media to be used in the formation of electrophotographic images has been advancing, and hence correspondence to thin paper having a basis weight of, for example, 52 g/m$^2$ has been required. However, such thin paper has low rigidity. Accordingly, molten toner has adhered to the surface of the surface layer of a related-art fixing member at the time of its heat fixation, and hence the thin paper has been wound around the fixing member in some cases. To stably form an electrophotographic image on the thin paper, higher toner releasability needs to be imparted to the surface of the fixing member.

Herein, in Japanese Patent Application Laid-Open No. 2018-22056, there are disclosures of a liquid-repellent film including, on its outermost surface, a layer containing a fluorine polymer, such as a PFA, the layer having covalently bonded thereto a compound having a perfluoropolyether (hereinafter sometimes referred to as "PFPE") structure or a perfluoroalkyl group, and a fixing member including the liquid-repellent film.

SUMMARY

An investigation made by the inventors has recognized that the fixing member according to Japanese Patent Application Laid-Open No. 2018-22056 has excellent toner releasability. In view of the foregoing, the inventors have made an investigation on a fixing member obtained by arranging the liquid-repellent film according to Japanese Patent Application Laid-Open No. 2018-22056 as a surface layer on an elastic layer containing a silicone rubber. As a result of long-term use, however, the toner releasability of the outer surface of the fixing member has reduced, and hence, at the time of the formation of an electrophotographic image on such thin paper as described above, the thin paper has been wound around the fixing member in some cases.

One aspect of the present disclosure is directed to the provision of a fixing member that can maintain high toner releasability over a long time period. In addition, another aspect of the present disclosure is directed to the provision of a fixing device conducive to long-term and stable formation of a high-quality electrophotographic image. Further, another aspect of the present disclosure is directed to the provision of an electrophotographic image-forming apparatus that can stably form a high-quality electrophotographic image over a long time period.

According to one aspect of the present disclosure, there is provided a fixing member for electrophotography including in the stated order in a thickness direction thereof:
a base layer;
an elastic layer; and
a surface layer on the elastic layer,
the elastic layer containing a silicone rubber,
the surface layer being constituted by a single layer,
the surface layer containing a fluorine resin and a fluorine oil having a perfluoropolyether structure,
wherein the fixing member satisfies a requirement (i) and a requirement (ii):
(i) as for a measurement sample taken from the fixing member and including a total thickness portion of the surface layer, when subjecting to a treatment including cleaning a predetermined position on a first surface which is an opposite side to a side facing the base layer, and pressing a detection surface of a quartz crystal microbalance (QCM) sensor against the position at a pressure of 0.4 MPa and a temperature of 180° C. for 50 msec, a mass P11 of an adhered substance including the fluorine oil having the perfluoropolyether structure, adhered in a unit area (1 cm$^2$) of the detection surface, is $1.0 \times 10^2$ ng or more and $1.0 \times 10^4$ ng or less; and
(ii) as for the measurement sample subjected to the treatment defined in the requirement (i), when subjecting to a treatment including, after cleaning of the position, placing the measurement sample in an environment of a temperature of 180° C. for 120 sec, and then pressing the detection surface of the quartz crystal microbalance (QCM) sensor against the position at a pressure of 0.4 MPa and a temperature of 180° C. for 50 msec, a mass P12 of an adhered substance including the fluorine oil having the perfluoropolyether structure, adhered in the unit area (1 cm$^2$) of the detection surface, is 0.5×P11 or more and 1.2×P11 or less.

In addition, according to another aspect of the present disclosure, there is provided a fixing member for electrophotography including in the stated order in a thickness direction thereof:
a base layer;
an elastic layer; and
a surface layer on the elastic layer,
the elastic layer containing a silicone rubber,
the surface layer being constituted by a single layer,
the surface layer containing a fluorine resin and a fluorine oil having a perfluoropolyether structure,
wherein
as for a measurement sample taken from the fixing member and including a total thickness portion of the surface layer,
when pressing a detection surface of a quartz crystal microbalance (QCM) sensor against a first surface which is an opposite side to a side facing the base layer at a pressure of 0.4 MPa and a temperature of 180° C. for 50 msec, a mass of an adhered substance including the fluorine oil having the perfluoropolyether structure, adhered in a unit area (1 cm$^2$) of the detection surface is defined as P11 (ng), and
when pressing the detection surface of the quartz crystal microbalance (QCM) sensor against a second surface which is the side facing the base layer of the measurement sample at a pressure of 0.4 MPa and a temperature of 180° C. for 50 msec, a mass of an adhered subject including the fluorine oil having the perfluoropolyether structure, adhered in the unit area (1 cm$^2$) of the detection surface is defined as P21 (ng), P21>P11.

Further, according to another aspect of the present disclosure, there is provided a fixing device including: the above-mentioned fixing member; and heating unit for heating the fixing member. Further, according to another aspect of the present disclosure, there is provided an electrophotographic image-forming apparatus including the above-mentioned fixing device.

Further features of the present disclosure will become apparent from the following description of exemplary embodiments with reference to the attached drawings.

DESCRIPTION OF THE EMBODIMENTS

Figure 1:
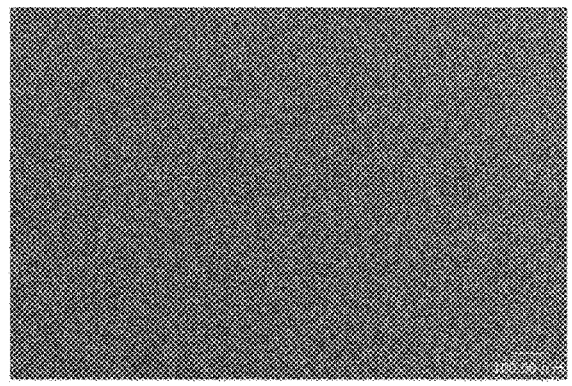
FIG. 1 is an image obtained by observing the surface of a fixing member described in Example 1.

An investigation made by the inventors has recognized that the fixing member according to Japanese Patent Application Laid-Open No. 2018-22056 has excellent toner releasability. In view of the foregoing, the inventors have made an investigation on a fixing member obtained by arranging the liquid-repellent film according to Japanese Patent Application Laid-Open No. 2018-22056 as a surface layer on an elastic layer containing a silicone rubber. As a result of long-term use, however, the toner releasability of the outer surface of the fixing member has reduced, and hence, at the time of the formation of an electrophotographic image on such thin paper as described above, the thin paper has been wound around the fixing member in some cases.

Such reduction in toner releasability with time may be caused by the abrasion of the surface layer due to repeated deformation of the surface layer along with the deformation of the elastic layer in a fixing nip portion. This is probably because the compound having the perfluoropolyether structure or the perfluoroalkyl chain, which contributes to an improvement in toner releasability, is lost from the outer surface of the fixing member.

The inventors have made investigations with a view to obtaining a fixing member that can maintain excellent toner releasability even when used for a long time period. As a result, the inventors have found that the fixing members according to the above-mentioned aspects can each satisfactorily achieve such object. The fixing member according to each aspect is described in detail below.

A fixing member according to one aspect of the present disclosure includes a base layer, an elastic layer, and a surface layer in the stated order in a thickness direction thereof. The elastic layer contains a silicone rubber. The surface layer is constituted by a single layer. The surface layer contains a fluorine resin and a fluorine oil having a perfluoropolyether structure (hereinafter sometimes simply referred to as "fluorine oil").

In addition, the fixing member satisfies the following requirements (i) and (ii):

Requirement (i): As for a measurement sample taken from the fixing member and including a total thickness portion of the surface layer, a predetermined position which is opposite side to a side facing the base layer is cleaned. Then, the sample is subjected to a treatment in which a detection surface of a quartz crystal microbalance (QCM) sensor is pressed against the position at a pressure of 0.4 MPa and a temperature of 180° C. for 50 msec. A mass P11 of an adhered substance including the fluorine oil, adhered in a unit area (1 cm$^2$) of the detection surface at this time, is $1.0 \times 10^2$ ng or more and $1.0 \times 10^4$ ng or less; and Requirement (ii): As for the measurement sample subjected to the treatment defined in the requirement (i), when subjecting to a treatment including, after cleaning of the position, the measurement sample is placed in an environment of a temperature of 180° C. for 120 sec. Then, the sample is subjected to a treatment in which the detection surface of the QCM sensor is pressed against the position at a pressure of 0.4 MPa and a temperature of 180° C. for 50 msec. A mass P12 of an adhered substance including the fluorine oil, adhered in the unit area (1 cm$^2$) of the detection surface at this time, is 0.5×P11 or more and 1.2×P11 or less.

The treatment specified in the requirement (i) is positioned as a treatment of transferring the fluorine oil in the surface layer to the first surface (hereinafter sometimes referred to as "outer surface") of the surface layer opposite to the side facing the base layer. That is, the pressing conditions (the pressure, the temperature, and the pressurization time) for the outer surface in the treatment specified in the requirement (i) are set so as to correspond to conditions applied to the outer surface of the surface layer of the fixing member in a fixing nip at the time of heat fixation in an electrophotographic image-forming process.

In addition, the amount of the fluorine oil present on the outer surface of the fixing member may be measured with a quartz crystal. The quartz crystal has sensitivity enabling the measurement of a mass of the order of nanogram. The quartz crystal has a structure in which surfaces on both sides of the crystal plate of quartz are sandwiched between metal electrodes, and when an AC electric field is applied to the metal electrodes on both the sides, the quartz crystal is oscillated at a constant frequency (resonance frequency) by the reverse voltage drop of the quartz. In addition, when a trace amount of a substance adheres onto any one of the metal electrodes, the resonance frequency reduces in proportion to its adhesion amount. The quartz crystal can be utilized as a microbalance by utilizing the phenomenon.

The amount of a change in frequency of the quartz crystal and the mass of the substance adhering onto the metal electrode follow the following Sauerbrey equation (equation (a)).

$$\Delta F = \frac{-2F_0^2}{\sqrt{\rho_Q \mu_Q}} \cdot \frac{\Delta m}{A} \qquad \text{Equation (a)}$$

(In the equation (a), $\Delta F$ represents the change in frequency, $\Delta m$ represents the amount of a change in mass, $F_0$ represents a fundamental frequency, $\rho_Q$ represents the density of the quartz, $\mu_Q$ represents the shear stress of the quartz, and A represents an electrode area.)

The measurement method is also referred to as "quartz crystal microbalance (QCM) method."

Further, the "cleaning" according to the requirement (i) is the following operation. A nonwoven fabric impregnated with ethanol is placed at the position, and a load of 20 kPa is applied onto the nonwoven fabric and reciprocated 10 times at the position. Subsequently, a nonwoven fabric impregnated with toluene is placed at the position, and a load of 20 kPa is applied onto the nonwoven fabric and reciprocated 10 times at the position. Thus, the fluorine oil present on the outer surface is mechanically removed. Meanwhile, none of ethanol and toluene elutes a PFPE present in the surface layer because none of ethanol and toluene dissolves the PFPE.

Therefore, the requirement (i) means that the amount in which the fluorine oil present in the surface layer is exuded to the first surface of the surface layer by the pressing treatment specified in the requirement (i) is $1.0 \times 10^2$ ng or more and $1.0 \times 10^4$ ng or less. In addition, when the P11 is set within the numerical range, the adhesion of toner to the outer surface of the fixing member at the time of its heat fixation can be significantly suppressed. As a result, the occurrence of a toner offset at the time of the heat fixation can be prevented, and the occurrence of an offset due to the cohesive failure of the toner resulting from the viscosity of the fluorine oil can also be prevented. In addition, the P11 is more preferably $1.0 \times 10^2$ ng or more and $5.0 \times 10^3$ ng or less.

As a method of preparing the measurement sample including the total thickness portion of the surface layer from the fixing member, for example, when the fixing member has a configuration in which the elastic layer and the surface layer are sequentially laminated on the base layer, there is given a method including cutting a laminate of the elastic layer and the surface layer out of the member, and removing the elastic layer from the laminate. A method of removing the elastic layer from the laminate is, for example, a method including peeling the surface layer from its interface portion with the elastic layer with a knife, or a method including dissolving and removing only the elastic layer with a solvent capable of dissolving a resin component in the elastic layer without dissolving the fluorine resin in the surface layer. For example, when the elastic layer contains the silicone rubber, only the elastic layer can be dissolved and removed from the laminate with a resin-dissolving agent (product name: e SOLVE 21RS, manufactured by Kaneko Chemical Co., Ltd.).

Next, the treatment according to the requirement (ii) is a treatment for the following purpose. The measurement sample in which the fluorine oil in the surface layer has been transferred to the first surface of the surface layer by the treatment according to the requirement (i) is subjected to cleaning in which the fluorine oil transferred to the first surface by the treatment according to the requirement (i) is removed. Next, the measurement sample is placed under a predetermined environment, and then the fluorine oil is transferred from the inside of the measurement sample to the first surface.

Herein, the "cleaning" refers to the same operation as that of the "cleaning" in the requirement (i). In addition, the fixing member according to this aspect is such that when the mass of the adhered substance including the fluorine oil, adhered in the unit area of the detection surface of the QCM sensor when the treatment according to the requirement (ii) is performed, is represented by P12, the P12 is 0.5 times or more and 1.2 times or less as large as the P11. The foregoing means that even after the fluorine oil transferred to the outer surface by the treatment according to the requirement (i) has been removed, such an appropriate amount of the fluorine oil that the first surface of the surface layer can express excellent toner releasability may transfer from the inside of the surface layer to the outer surface.

That is, the fixing member satisfying the requirement (i) and the requirement (ii) can maintain high toner releasability over a long time period because even when the fluorine oil of the outer surface is consumed once in one heat fixing step, the fluorine oil is supplied from the inside of the surface layer to the outer surface.

For example, a tack tester (product name: TAC-1000, manufactured by RHESCA Co., Ltd.) may be used in the pressing treatment according to any one of the requirements (i) and (ii). Specifically, the quartz crystal is mounted on the stage portion of the tester. Meanwhile, the measurement sample including the total thickness portion of the surface layer, the sample being collected from the fixing member, is fixed to the probe of the tester so that the first surface of the measurement sample may face the quartz crystal. Next, the probe is brought closer to the stage portion to press the first surface of the measurement sample against the quartz crystal. Pressing conditions are as described below.

Pressure: 0.4 MPa,
Pressing time: 50 msec,
Pressing amount constant mode,
Pressing and lifting speed: 1.0 mm/sec,
Probe set temperature: 180° C.

1. Fixing Member

Figure 3A:
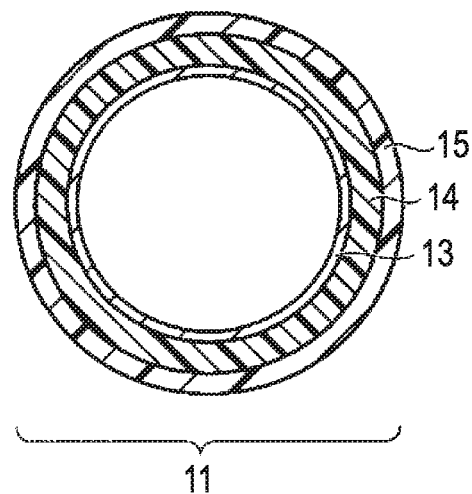
FIG. 3A is a schematic sectional view of a fixing belt that is an example of the present disclosure.
Figure 3B:
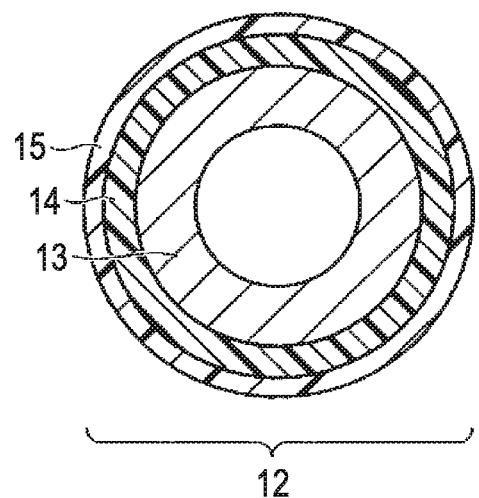
FIG. 3B is a schematic sectional view of a fixing roller that is an example of the present disclosure.

FIG. 3A and FIG. 3B are sectional views for illustrating the fixing members according to different aspects of the present disclosure. FIG. 3A is an illustration of a fixing member having an endless belt shape (hereinafter sometimes referred to as "fixing belt 11"), and FIG. 3B is an illustration of a fixing member having a roller shape (hereinafter sometimes referred to as "fixing roller 12").

The fixing member according to any one of FIG. 3A and FIG. 3B includes: a base layer 13; an elastic layer 14 covering the outer surface of the base layer; and a surface layer 15 covering the surface of the elastic layer opposite to a side facing the base layer. The surface layer 15 may be bonded to the surface of the elastic layer 14 opposite to the side facing the base layer with an adhesion layer (not shown).

Figure 7A:
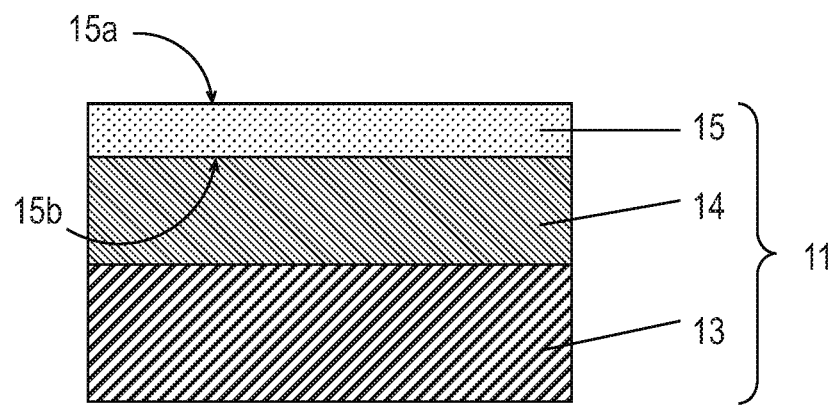
FIG. 7A is a schematic sectional view of a fixing member according to the present disclosure.
Figure 7B:
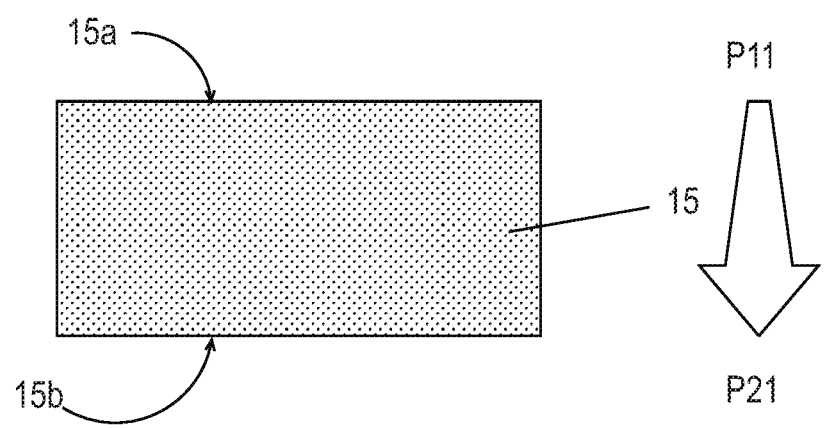
FIG. 7B is a schematic view of the fluorine oil amount of the surface layer of the fixing member according to the present disclosure.

FIG. 7A is a sectional view for illustrating the base layer 13, elastic layer 14, and surface layer 15 of the fixing member according to this aspect, and a relationship between the first surface (outer surface) 15a of the surface layer 15 opposite to the side facing the base layer and the second surface 15b thereof on the side facing the base layer. FIG. 7B is an illustration of the fact that when the mass P11 of the fluorine oil on the first surface 15a and the mass P21 of the fluorine oil on the second surface 15b in the surface layer 15 are compared to each other, the P21 is larger than the P11.

(1) Base Layer

Metals and alloys, such as aluminum, iron, stainless steel, and nickel, and heat-resistant resins, such as a polyimide, are each used as a material for the base layer 13.

In the fixing belt 11, a base material having an endless belt shape may be used as the base layer 13. A material for the base layer 13 in this case is, for example, a material excellent in heat resistance, such as nickel, stainless steel, or a polyimide. The thickness of such base layer 13, which is not particularly limited, is preferably set to 20 μm or more and 100 μm or less from the viewpoints of, for example, its strength, flexibility, and heat capacity.

In the fixing roller 12, for example, a solid or hollow mandrel is used as the base layer 13. A material for the mandrel is, for example, a metal or an alloy, such as aluminum, iron, or stainless steel. When a hollow mandrel is used, a heat source may be arranged therein.

The outer surface of the base layer 13 may be subjected to a surface treatment for imparting an adhesive property with the elastic layer 14. Physical treatments, such as a blast treatment, a lapping treatment, and polishing, and chemical treatments, such as an oxidation treatment, a coupling agent treatment, and a primer treatment, may be used alone or in combination thereof as the surface treatment.

When the elastic layer 14 containing a silicone rubber is arranged on the surface of the base layer 13, the surface of the base layer 13 is preferably subjected to a primer treatment for improving an adhesive property between the base layer 13 and the elastic layer 14. A primer to be used in the primer treatment is, for example, a paint obtained by appropriately blending and dispersing a silane coupling agent, a silicone polymer, hydrogenated methylsiloxane, an alkoxysilane, a reaction-accelerating catalyst, or a colorant, such as red iron oxide, in an organic solvent.

The primer may be appropriately selected in accordance with the material for the base layer 13, the kind of the elastic layer 14, or the mode of a crosslinking reaction. In particular, when the elastic layer 14 contains a large amount of an unsaturated aliphatic group, a primer containing a hydrosilyl group is suitably used for imparting an adhesive property through a reaction with the unsaturated aliphatic group. When the elastic layer 14 contains a large amount of a hydrosilyl group, a primer containing an unsaturated aliphatic group is suitably used. In addition to the foregoing, a primer containing an alkoxy group is also available as the primer. A commercial product may be used as the primer. In addition, the primer treatment includes a step of applying the primer to the outer surface of the base layer 13 (surface to be bonded to the elastic layer 14), followed by the drying or baking of the primer.

(2) Elastic Layer

A silicone rubber excellent in heat resistance is preferably incorporated into the elastic layer 14. In addition, an addition-curable liquid silicone rubber is preferably used as a raw material for the silicone rubber.

The thickness of the elastic layer 14 may be appropriately designed in consideration of the surface hardness of the fixing member and the width of a fixing nip portion to be formed. When the fixing member is the fixing belt 11, the thickness of the elastic layer 14 is preferably 100 μm or more and 500 μm or less, more preferably 200 μm or more and 400 μm or less.

In addition, when the fixing member is the fixing roller 12, the thickness of the elastic layer 14 is preferably 0.1 mm (100 μm) or more and 3.0 mm or less, more preferably 0.3 mm (300 μm) or more and 2.0 mm or less.

When the thickness of the elastic layer 14 is set within the ranges, a sufficient width of the fixing nip portion can be secured at the time of the incorporation of the fixing member into a fixing device.

In addition, when the elastic layer contains a silicone rubber poor in chemical affinity for the fluorine oil, the fluorine oil incorporated into the surface layer hardly transfers to the elastic layer even at the time of long-term use of the fixing member, and is exclusively supplied to the surface of the fixing member.

The elastic layer 14 may contain a filler. The filler is added for controlling the thermal conductivity, heat resistance, and elastic modulus of the layer. Specific examples thereof include silicon carbide (SiC), silicon nitride ($Si_3N_4$), silica ($SiO_2$), boron nitride (BN), aluminum nitride (AlN), alumina ($Al_2O_3$), iron oxide ($Fe_2O_3$), zinc oxide (ZnO), magnesium oxide (MgO), titanium oxide ($TiO_2$), copper (Cu), aluminum (Al), silver (Ag), iron (Fe), nickel (Ni), carbon black (C), a carbon fiber (C), and a carbon nanotube (C).

In addition, a reaction-controlling agent (inhibitor) called an inhibitor for controlling a reaction start time may be blended into a material for forming the elastic layer 14. Known substances, such as methyl vinyl tetrasiloxane, acetylene alcohols, a siloxane-modified acetylene alcohol, and a hydroperoxide, are each used as the reaction-controlling agent.

(3) Surface Layer

The surface layer 15 contains the fluorine resin and the fluorine oil having the perfluoropolyether (PFPE) structure. In addition, the surface layer satisfies the requirement (i) and the requirement (ii).

The fixing member satisfying the requirement (i) and the requirement (ii) may be achieved by, for example, such a surface layer as described below: the surface layer contains a larger amount of the fluorine oil on its base layer side than on its outer surface side in its thickness direction.

For example, as for a measurement sample taken from the fixing member and including a total thickness portion of the surface layer, the detection surface of the quartz crystal microbalance (QCM) sensor is pressed against the second surface which is opposite side to a side facing the base layer at a pressure of 0.4 MPa and a temperature of 180° C. for 50 msec. When a mass of an adhered substance including the fluorine oil having the perfluoropolyether structure, adhered in the unit area (1 $cm^2$) of the detection surface at this time, is defined as P21 (ng), the fixing member in which the P21 and the P11 show a relationship represented by the following expression (1) may achieve the requirement (i) and the requirement (ii).

$$P21 > P11 \quad (1)$$

It has been considered to be difficult to cause the fluorine resin and the fluorine oil to interact with each other without phase-separating the resin and the oil because both of the resin and the oil have small surface free energies. However, the inventorshave found that when the fluorine oil is brought into contact with the outer surface of the surface layer at a temperature near the melting point of the fluorine resin in the surface layer, the fluorine oil can be incorporated into the surface layer without being phase-separated from the fluorine resin. In addition, when the fluorine oil was incorporated into the surface layer by such method, in the thickness direction of the surface layer, the fluorine oil permeated up to the vicinity of an interface with the elastic layer in the surface layer, and the concentration of the fluorine oil was higher in the vicinity of the interface than on the first surface side of the surface layer.

Although the reason why the concentration of the fluorine oil becomes higher on the side of the surface layer closer to the elastic layer is unclear, the inventors have assumed the reason to be as described below. First, when the fluorine oil is brought into contact with the outer surface at the temperature near the melting point of the fluorine resin, the fluorine oil rapidly diffuses in the fluorine resin to reach the vicinity of the interface with the elastic layer. Next, in a process in which the surface layer is cooled from the temperature near the melting point of the fluorine resin to room temperature, the molecular contraction of the fluorine resin in the surface layer occurs, and hence the fluorine oil is discharged from the first surface side to the first surface of the surface layer. Probably as a result of the foregoing, the concentration of the fluorine oil in the surface layer becomes higher on the interface side with the elastic layer than on the first surface side of the surface layer.

In addition, when such concentration gradient of the fluorine oil is formed in the surface layer, the surface layer functions as a fluorine oil reservoir. Probably because of the foregoing, even when the fluorine oil on the first surface of the surface layer is consumed at the time of heat fixation, the fluorine oil of the surface layer is continuously supplied to the first surface by the principle of mass diffusion, and hence the toner releasability of the outer surface of the fixing member is maintained even at the time of long-term use of the member.

A difference between the concentrations of the fluorine oil on the first surface side and the interface side with the elastic layer in the thickness direction of the surface layer may be easily identified through, for example, measurement by infrared spectroscopy.

Any method may be used in the production of the fixing member according to this aspect as long as the fluorine oil including the PFPE structure can be brought into contact with, and impregnated into, the surface layer at a temperature near the melting point of the fluorine resin in the surface layer. The surface layer to be brought into contact with the fluorine oil may be the surface layer in the fixing member obtained by laminating the base layer, the elastic layer, and the surface layer in advance, or a product obtained as follows may be used: a fluorine resin tube for the surface layer is prepared, and its surface on a side to be brought into contact with the elastic layer is brought into a state of being masked. In addition, for example, a dipping method may be adopted as a method of bringing the fluorine oil into contact with the surface layer.

Specifically, for example, when the surface layer contains, as the fluorine resin, a copolymer of tetrafluoroethylene ($-C_2F_4-$) and a perfluoroalkyl vinyl ether ($-CF_2-CF(ORf)-$) (hereinafter sometimes referred to as "PFA"), the fixing member may be obtained through the following step (a) to step (c).

Step (a) A preliminary fixing member in which the base layer, the elastic layer containing the silicone rubber, and the resin layer containing the PFA are laminated in the stated order is mounted on a dipping apparatus.

Step (b) The preliminary fixing member is immersed in a fluorine oil bath heated to a temperature near the melting point of the PFA (300° C.±50° C.) in advance, and is left to stand for 5 minutes.

Step (c) The preliminary fixing member is removed from the fluorine oil bath, and then the PFPE adhering to the outer surface of the resin layer is removed, followed by the cooling of the member to room temperature.

The temperature of the fluorine oil bath in the step (b) has a correlation with the amount of the fluorine oil impregnated into the resin layer, and the impregnation amount increases as the temperature becomes higher. In addition, the time period for which the preliminary fixing member and the fluorine oil are brought into contact with each other only needs to be from several minutes to several tens of minutes. Although a method of removing an excessive amount of the PFPE adhering to the surface is not particularly limited, examples thereof include a method including washing the PFPE with a fluorine solvent and a method including removing the PFPE with air.

A method of supplying the fluorine oil to the outer surface of the resin layer is not limited to the above-mentioned dipping method. For example, known coating methods, such as spray coating, roll coating, and beam coating, may each be used as the method of supplying the fluorine oil to the outer surface of the resin layer.

<Fluorine Resin>

The fluorine resin is not particularly limited, and specific examples thereof include: crystalline fluorine resins, such as a polytetrafluoroethylene (PTFE), a tetrafluoroethylene-perfluoroalkyl vinyl ether copolymer (PFA), a tetrafluoroethylene-hexafluoropropylene copolymer (FEP), a polychlorotetrafluoroethylene (PCTFE), a tetrafluoroethylene-ethylene copolymer (ETFE), a chlorotrifluoroethylene-ethylene copolymer (ECTFE), a polyvinylidene fluoride (PVDF), and a polyvinyl fluoride (PVF); and amorphous fluorine resins each having a cyclic perfluoropolyether structure. In particular, a PFA may be suitably used from the viewpoints of heat resistance, mechanical strength, and processability.

The PFA is a copolymer of a perfluoroalkyl vinyl ether (hereinafter referred to as "PAVE") and tetrafluoroethylene (hereinafter referred to as "TFE"), and the PAVE is selected from perfluoromethyl vinyl ether ($CF_2=CF-O-CF_3$), perfluoroethyl vinyl ether ($CF_2=CF-O-CF_2CF_3$), and perfluoropropyl vinyl ether ($CF_2=CF-O-CF_2CF_2CF_3$).

A commercial product may be used as the PFA, and specific examples thereof are given below:
"451HP-J", "959HP-Plus", "350-J", and "950HP-Plus" (each of which is a product name, manufactured by Chemours-Mitsui Fluoroproducts Co., Ltd.);
"P-66P", "P-66PT", and "P-802UP" (each of which is a product name, manufactured by AGC);
"AP-230", "AP-231SH", and the like (each of which is a product name, manufactured by Daikin Industries, Ltd.); and "6502N" (product name, manufactured by 3M).

With regard to the PFA, the impregnation amount of the PFPE has a correlation with a PAVE content in the PFA, and the impregnation amount increases as the PAVE content becomes larger. This is probably because the fluorine oil easily interacts with the amorphous portion of the PFA having high molecular mobility. The PAVE content in the PFA is preferably 1 mol % or more and 5 mol % or less, particularly preferably 3 mol % or more and 5 mol % or less in the molecular chain of the PFA. The PAVE content may be calculated by subjecting the PFA to $^{19}$F-NMR measurement.

The PAVE contents of "451HP-J", "959HP-Plus", "950HP-Plus", "P-66P", "P-66PT", "AP-231SH", "6502N", and "AW-5000L" out of the commercial PFAs described above are shown in Table 1.

TABLE 1

| Product name of PFA | PAVE content [mol %] |
|---|---|
| "451HP-J" | 1.4 |
| "959HP-Plus" | 4.2 |
| "950HP-Plus" | 2.8 |
| "P-66P" | 1.3 |
| "P-66PT" | 1.3 |
| "P-802UP" | 1.3 |
| "AP-231SH" | 1.9 |
| "6502N" | 1.5 |
| "AW-5000L" | 1.6 |

<Fluorine Oil>

The fluorine oil has the perfluoropolyether structure, and is specifically, for example, a perfluoropolyether (PFPE) having a structure represented by the following structural formula (1). Of such PFPEs, a PFPE that is in an oil state at the melting point of the fluorine resin is suitably used.

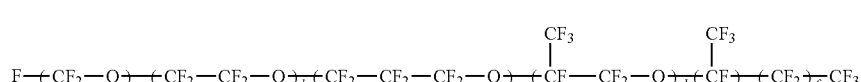

(In the structural formula (1), "a", "b", "c", "d", "e", and "f" each independently represent 0 or a positive integer, and satisfy 1≤a+b+c+d+e+f≤600, and at least one of "a", "b", "c", or "d" represents a positive integer.)

In addition, the order in which the respective repeating units in the structural formula (1) are present is not limited to the order represented in the structural formula (1). Further, each repeating unit may be present at a plurality of sites in the PFPE represented by the structural formula (1). That is, the PFPE represented by the structural formula (1) may be a block copolymer, or may be a random copolymer.

The molecular weight of the PFPE is set to preferably 5,000 or more, particularly preferably 7,000 or more in terms of number-average molecular weight from the viewpoint of its heat resistance. In addition, the molecular weight is set to preferably 100,000 or less, particularly preferably 30,000 or less from the viewpoint of the ease with which the PFPE interacts with the fluorine resin when brought into contact therewith. Even when the PFPE having the molecular weight is heated in air at 350° C. for 30 minutes, the weight loss of the PFPE is less than 1%, and hence the thermal decomposition thereof is extremely small even at a temperature near the melting point of the fluorine resin.

The content of the PFPE in the surface layer is preferably 1.0 mass % or more and 25 mass % or less with respect to the total amount of the fluorine resin and the PFPE. When the content is less than 1 mass %, the releasability of the surface layer cannot be improved, and when the content is more than 25 mass %, an excessive amount of the PFPE is liable to be supplied to the nip portion, and hence a toner offset is liable to occur.

Specific examples of the PFPE having a structure included in the structure represented by the structural formula (1) are given below. A PFPE having at least one kind of chemical structure selected from the group consisting of the structural formulae (2) to (4) may be given as an example thereof.

A PFPE having a structure represented by the structural formula (2) (e.g., "Demnum 5-200" and "Demnum S-100" (each of which is a product name; manufactured by Daikin Industries, Ltd., referred to as "Demnum type")):

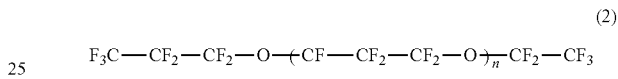

(In the structural formula (2), "n" represents an integer of 1 or more.)

A PFPE having a structure represented by the structural formula (3) (e.g., "Krytox GPL107", "Krytox GPL106", "Krytox 143AD", "Krytox VPF16256", "Krytox XHT-500", "Krytox XHT-750", and "Krytox XHT-1000" (each of which is a product name; manufactured by Chemours, referred to as "Krytox type")):

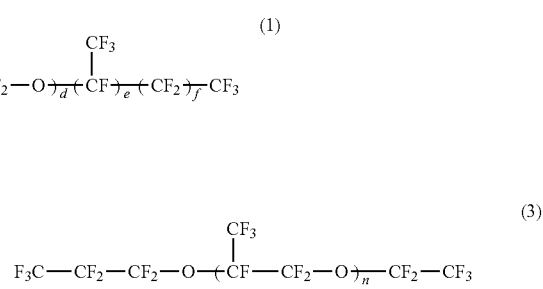

(In the structural formula (3), "n" represents an integer of 1 or more.)

A PFPE represented by the structural formula (4) (e.g., "Fomblin M60" and "Fomblin M30" (each of which is a product name, manufactured by Solvay, referred to as "Fomblin type")):

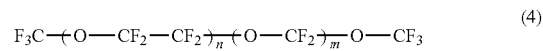

In the Structural Formula (4), "m" and "n" Each Independently Represent an Integer of 1 or More The impregnation amount of the perfluoropolyether has a correlation with a solubility parameter. Specifically, the impregnation amount may be controlled by a difference (ΔHSP value) between the SP values of the fluorine resin and the perfluoropolyether calculated by Hansen solubility parameters (HSP values). As the ΔHSP value between the two components becomes smaller, both the components are more easily soluble in each other, that is, more easily miscible with each other, and hence the impregnation amount increases.

The ΔHSP value may be calculated by using the 3rd edition 3.1.14 of calculation software with a database "HSPiP" developed and sold by the Hansen group. The inventors have calculated the ΔHSP value between the PFA and the PFPE. As a result, the inventors have found that the ΔHSP value between the PFA and the PFPE having the Krytox type structure, that between the PFA and the PFPE having the Demnum type structure, and that between the PFA and the PFPE having the Fomblin type structure were 2.8, 3.6, and 5.4, respectively, and hence the affinity of the PFPE for the PFA varied depending on its chemical structure. That is, when the PFPEs of the respective chemical structures are brought into contact with the PFA under the same conditions, the PFPE having the Krytox type structure is most compatible with the PFA.

The thickness of the surface layer 15 is, for example, preferably 3.0 μm or more, more preferably 5.0 μm or more, particularly preferably 10 μm or more from the viewpoint of suppressing the abrasion of the surface of the fixing member at the time of its use. In addition, the thickness is preferably 50 μm or less, particularly preferably 40 μm or less from the viewpoint of suppressing a reduction in thermal conductivity of the fixing member in its thickness direction.

2. Heat-Fixing Device

A heat-fixing device according to one aspect of the present disclosure includes: a rotating body for heating; and a rotating body for pressurization arranged so as to form a fixing nip portion with the rotating body for heating. Examples of the combination of the rotating body for heating and the rotating body for pressurization may include: a heating roller and an elastic pressurizing roller arranged so as to face the heating roller; and a heating film and an elastic pressurizing roller arranged so as to be brought into abutment with the heating film. Other examples of the combination of the rotating body for heating and the rotating body for pressurization may include: a heating belt and an elastic pressurizing roller arranged so as to be brought into abutment with the heating belt; and a heating belt and an elastic pressurizing belt arranged so as to be brought into abutment with the heating belt.

(1) Fixing Device using Fixing Belt

Figure 4:
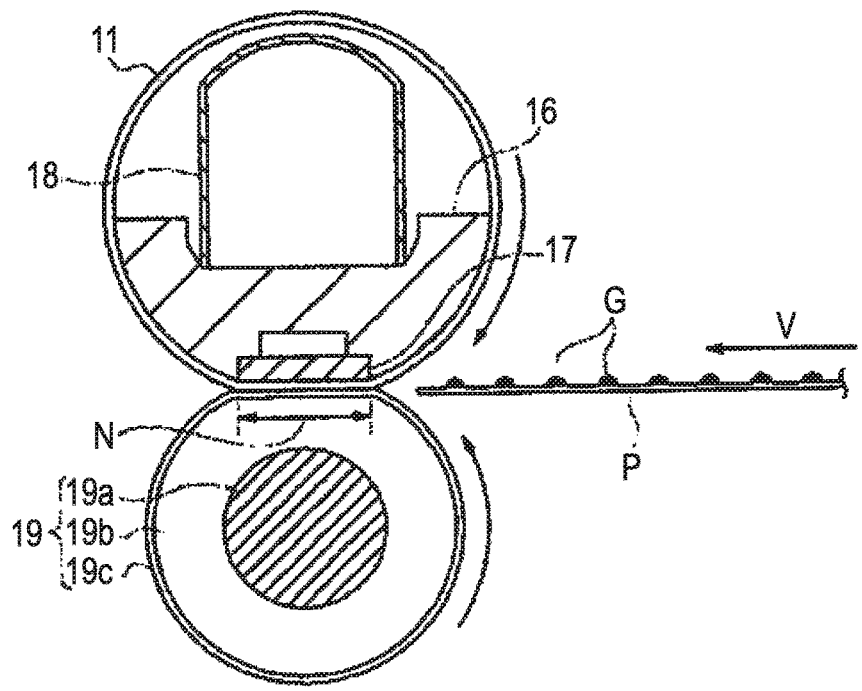
FIG. 4 is a schematic sectional view of a fixing device using the fixing belt according to the present disclosure.

FIG. 4 is a sectional view of a heat-fixing device, which includes the fixing belt 11 for heating and an elastic pressurizing roller 19, in a direction perpendicular to its longitudinal direction.

The fixing belt 11 is a fixing belt according to one aspect of the present disclosure. The fixing belt 11 is loosely fit onto a belt guide member 16. A rigid stay 18 for pressurization is inserted into the inside of the belt guide member 16. The belt guide member 16 is formed of, for example, a resin having heat resistance and a heat-insulating property.

The heat-fixing device includes a ceramic heater 17 serving as a heat source at the position at which the belt guide member 16 and the inner surface of the fixing belt 11 are brought into contact with each other. The ceramic heater 17 is fixed by being fit into a groove portion arranged along the longitudinal direction of the belt guide member 16. The ceramic heater 17 is energized by unit (not shown) to generate heat.

The elastic pressurizing roller 19 is, for example, such that an elastic layer 19b containing a cured silicone rubber is arranged on the peripheral surface of a stainless steel-made mandrel 19a. In addition, a surface layer 19c containing a fluorine resin is arranged on the peripheral surface of the elastic layer 19b. The thickness of the surface layer 19c is, for example, 50 μm.

A pressurizing spring (not shown) is arranged under a contracted state between each of both end portions of the rigid stay 18 for pressurization and a spring-receiving member (not shown) on a device chassis side to apply a depressing force to the rigid stay 18 for pressurization. Thus, the lower surface of the ceramic heater 17 arranged on the lower surface of the belt guide member 16 and the upper surface of the elastic pressurizing roller 19 are brought into press contact with each other with the fixing belt 11 sandwiched therebetween, thereby forming a predetermined fixing nip portion N. That is, the lower surface of the ceramic heater 17 is arranged so as to be brought into contact with the inner peripheral surface of the fixing belt 11.

A recording medium P serving as a body to be heated, on which images have been formed with an unfixed toner G, is conveyed to the fixing nip portion N at a conveying velocity V so as to be sandwiched between the fixing belt and the elastic pressurizing roller. Thus, the toner images are heated and pressurized. As a result, the toner images are melted and subjected to color mixing. After that, when the toner images are cooled, the toner images are fixed onto the recording medium P.

(2) Heat-fixing Device using Fixing Roller

Figure 5:
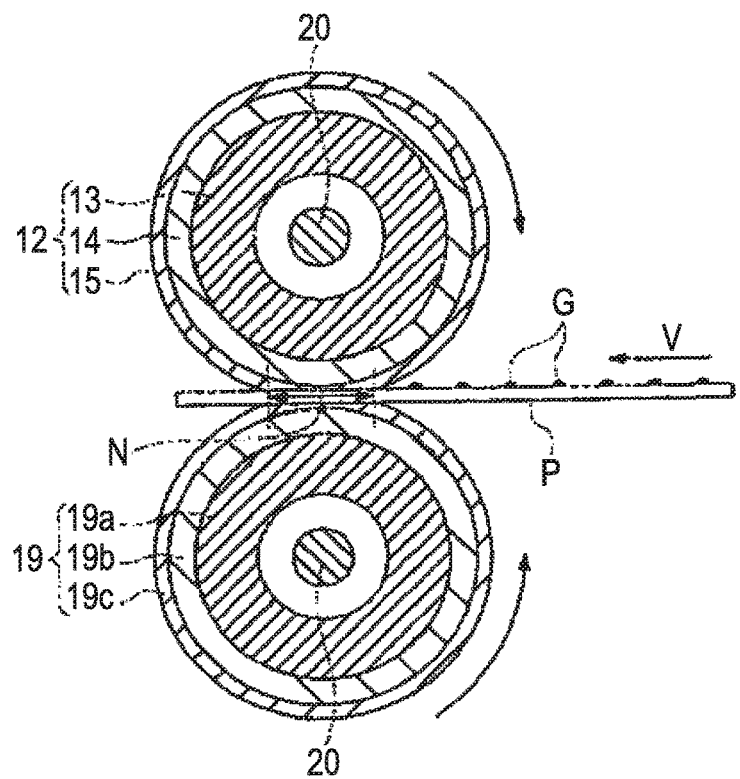
FIG. 5 is a schematic sectional view of a fixing device using the fixing roller according to the present disclosure.

FIG. 5 is a sectional view of a heat-fixing device, which includes the fixing roller 12 for heating, the elastic pressurizing roller 19 arranged so as to face the fixing roller 12, and a heater 20 that is heating unit for heating the fixing roller 12, in a direction perpendicular to its longitudinal direction.

The fixing roller 12 is a fixing roller according to one aspect of the present disclosure. In the fixing roller 12, the elastic layer 14 is formed on the outer peripheral surface of a hollow mandrel serving as the base layer 13, and the surface layer 15 is further formed on the outside of the elastic layer.

The fixing roller 12 and the elastic pressurizing roller 19 are rotatably pressed against each other by pressurizing unit (not shown) to form the fixing nip portion N.

The heater 20 serving as a heat source configured to supply heat needed for melting the unfixed toner G is arranged in each of the fixing roller 12 and the elastic pressurizing roller 19. A halogen heater is generally used as the heater 20. A plurality of halogen heaters may be arranged therein in accordance with the size of the recording medium P to be conveyed.

A rotational force is applied to the fixing roller 12 and the elastic pressurizing roller 19 by unit (not shown) through the end portions of the base layer (mandrel) 13 and the mandrel 19a to control their rotations so that the moving speed of the surface of the fixing roller 12 may be substantially equal to the conveying velocity V of the recording medium P. At this time, the rotational force may be applied to one of the fixing roller 12 and the elastic pressurizing roller 19 having elasticity, and the other may rotate following the rotation of the roller having applied thereto the force. Alternatively, the rotational force may be applied to both the rollers.

The recording medium P serving as a body to be heated, on which the images have been formed with the unfixed toner G, is conveyed to the fixing nip portion N of the fixing device thus formed so as to be sandwiched between the rollers. Thus, the toner images are heated and pressurized.

As a result, the toner images are melted and subjected to color mixing. After that, when the toner images are cooled, the toner images are fixed onto the recording medium P.

3. Image-Forming Apparatus

An image-forming apparatus is, for example, a multifunction machine, a copying machine, a facsimile, or a printer using an electrophotographic system. Herein, the overall configuration of the image-forming apparatus is schematically described by using a color laser printer as an example.

Figure 6:
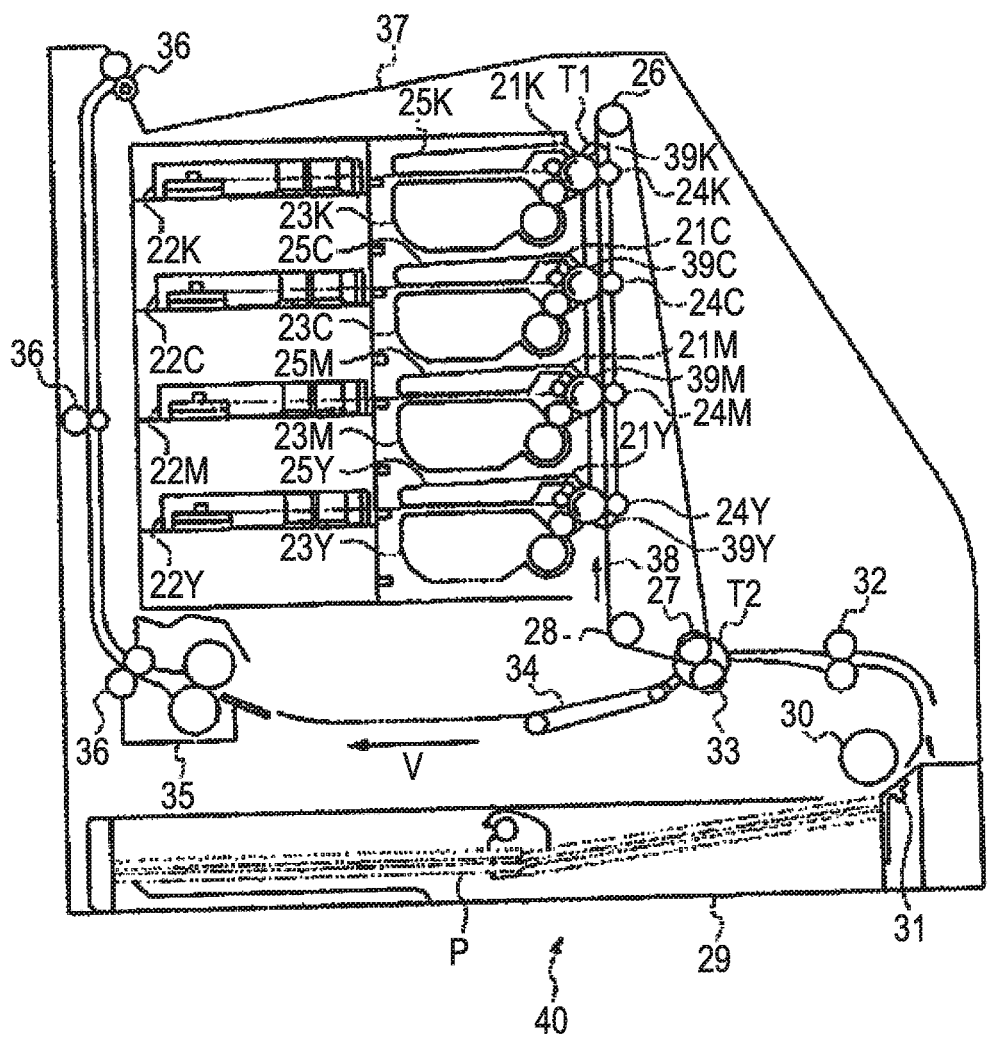
FIG. 6 is a schematic sectional view for illustrating an electrophotographic image-forming apparatus according to one aspect of the present disclosure.

FIG. 6 is a schematic sectional view of a laser printer 40 according to one aspect of the present disclosure. The laser printer 40 illustrated in FIG. 6 includes, for each of yellow (Y), magenta (M), cyan (C), and black (K) colors, an image-forming portion including an electrophotographic photosensitive drum 39 (hereinafter referred to as "photosensitive drum 39") configured to rotate at a constant speed. In addition, the laser printer includes an intermediate transfer member 38 configured to hold color images, which have been developed in the image-forming portions and transferred in a multiple manner, and to further transfer the images onto the recording medium P fed from a feeding portion.

The photosensitive drums 39 (39Y, 39M, 39C, and 39K) are each rotationally driven counterclockwise by driving unit (not shown) as illustrated in FIG. 6.

A charging device 21 (21Y, 21M, 21C, or 21K) configured to uniformly charge the surface of each of the photosensitive drums 39, a scanner unit 22 (22Y, 22M, 22C, or 22K) configured to irradiate the photosensitive drum 39 with laser beam based on image information to form an electrostatic latent image thereon, a developing unit 23 (23Y, 23M, 23C, or 23K) configured to cause toner to adhere to the electrostatic latent image to develop the image as a toner image, a primary transfer roller 24 (24Y, 24M, 24C, or 24K) configured to transfer the toner image on the photosensitive drum 39 onto the intermediate transfer member 38 in a primary transfer portion T1, and a cleaning unit 25 (25Y, 25M, 25C, or 25K) including a cleaning blade configured to remove transfer residual toner remaining on the surface of the photosensitive drum 39 after the transfer are sequentially arranged around the photosensitive drum 39 in accordance with its rotation direction.

At the time of image formation, the intermediate transfer member 38 having a belt shape, which is suspended over rollers 26, 27, and 28, rotates, and the toner images of the respective colors formed on the respective photosensitive drums 39 are primarily transferred onto the intermediate transfer member 38 in a superimposed manner. Thus, a color image is formed.

In synchronization with the primary transfer onto the intermediate transfer member 38, the recording medium P is conveyed to a secondary transfer portion T2 by conveying unit. The conveying unit includes: a feeding cassette 29 storing the plurality of recording media P; a feeding roller 30; a separating pad 31; and a registration roller pair 32. At the time of the image formation, the feeding roller 30 is driven to rotate in accordance with an image-forming operation to separate the recording media P in the feeding cassette 29 one by one, and the separated recording medium is conveyed to the secondary transfer portion T2 by the registration roller pair 32 in timing with the image-forming operation.

A secondary transfer roller 33 that can move is arranged in the secondary transfer portion T2. The secondary transfer roller 33 can move in a substantially vertical direction. In addition, at the time of image transfer, the secondary transfer roller 33 is pressed against the intermediate transfer member 38 at a predetermined pressure through the recording medium P. At the same time, a bias is applied to the secondary transfer roller 33, and hence the toner image on the intermediate transfer member 38 is transferred onto the recording medium P.

The intermediate transfer member 38 and the secondary transfer roller 33 are each driven, and hence the recording medium P in a state of being sandwiched therebetween is conveyed in a left arrow direction illustrated in FIG. 6 at the predetermined conveying velocity V. Further, the recording medium is conveyed to a fixing portion 35 for the next step by a conveying belt 34. In the fixing portion 35, heat and a pressure are applied to fix the transferred toner image onto the recording medium P. The recording medium P is discharged onto a discharge tray 37 on the upper surface of the device by discharge roller pairs 36.

In addition, when the fixing device of the present disclosure illustrated in FIG. 4 and FIG. 5 are applied to the fixing portion 35 and secondary transfer roller 33 of the electrophotographic image-forming apparatus illustrated in FIG. 6, respectively, an image-forming apparatus that can provide a high-quality image excellent in image uniformity can be obtained.

According to one aspect of the present disclosure, the fixing member that can maintain excellent toner releasability even when used for a long time period can be obtained. In addition, according to another aspect of the present disclosure, the fixing device conducive to stable formation of a high-quality electrophotographic image can be obtained. Further, according to another aspect of the present disclosure, the electrophotographic image-forming apparatus that can stably form a high-quality electrophotographic image over a long time period can be obtained.

EXAMPLES

Now, the present disclosure is specifically described by way of Examples. However, the present disclosure is not limited to Examples described in the following.

In Examples, fixing members were produced by using the following fluorine resins and fluorine oils.

Fluorine Resin

PFA-1: "959HP-Plus" (product name, manufactured by Chemours-Mitsui Fluoroproducts Co., Ltd.)
PFA-2: "451HP-J" (product name, manufactured by Chemours-Mitsui Fluoroproducts Co., Ltd.)
PFA-3: "950HP-Plus" (product name, manufactured by Chemours-Mitsui Fluoroproducts Co., Ltd.)
PFA-4: "P66P" (product name, manufactured by AGC)
PFA-5: "AW-5000L" (product name, manufactured by Daikin Industries, Ltd.) (Fluorine Oil)
PFPE-1: "Krytox GPL107" (product name, manufactured by Chemours)
PFPE-2: "Krytox GPL106" (product name, manufactured by Chemours)
PFPE-3: "Demnum 5200" (product name, manufactured by Daikin Industries, Ltd.)
PFPE-4: "Krytox 143AD" (product name, manufactured by Chemours)
PFPE-5: "Krytox VPF16256" (product name, manufactured by Chemours)
PFPE-6: "Krytox XHT-1000" (product name, manufactured by Chemours)
PFPE-7: "Fomblin M60" (product name, manufactured by Solvay)

Example 1

Production of Preliminary Fixing Belt

A base material having an endless belt shape manufactured by nickel electroforming, the base material having an inner diameter of 30 mm, a width of 400 mm, and a thickness of 40 μm, was prepared as a base layer. The outer peripheral surface of the base material was subjected to a primer treatment.

An addition-curable liquid silicone rubber free of any filler (product name: SE 1886, manufactured by Dow Corning Toray Co., Ltd.) was prepared as a raw material for forming an elastic layer. 38 Parts by volume of spherical alumina (product name: ALUNABEADS CB-A30S, manufactured by Showa Denko K.K.) serving as a spherical filler and 1 part by volume of vapor grown carbon fibers (product name: VGCF-S, manufactured by Showa Denko K.K., aspect ratio=100, average fiber length=10 μm) serving as an irregular-shaped filler were added to 61 parts by volume of the liquid silicone rubber. Thus, an addition-curable silicone rubber composition for forming an elastic layer was prepared. The composition was applied onto the outer peripheral surface of the base material by using a ring coating method, and was then heated at a temperature of 200° C. for 4 hours so that the layer of the addition-curable silicone rubber composition was crosslinked. Thus, an elastic layer having a thickness of 300 μm was formed.

While the base material having formed thereon the elastic layer was rotated in its peripheral direction at a moving speed of 20 mm/sec, the surface of the elastic layer was irradiated with UV light under an air atmosphere by using a UV lamp arranged at a position distant from the surface of the elastic layer by a distance of 10 mm. A low-pressure mercury UV lamp (product name: GLQ500US/11, manufactured by Toshiba Lighting & Technology Corporation) was used as the UV lamp, and the irradiation was performed so that the integrated quantity of light having a wavelength of 185 nm on the irradiation surface became 800 mJ/cm$^2$.

Next, an addition-curable silicone rubber adhesive (obtained by mixing equal amounts of the "liquid A" and "liquid B" of a product available under the product name "SE 1819 CV" from Dow Corning Toray Co., Ltd.) was applied to the surface of the elastic layer in a substantially uniform manner so that its thickness became about 20 μm.

Next, the adhesive was covered with the fluorine resin tube whose inner surface had been subjected to a hydrophilic treatment (PFA-1, thickness: 20 μm, melting point: 296° C.), and the surface of the belt was uniformly squeezed from above the fluorine resin tube so that an excessive amount of the adhesive was squeezed out of a space between the elastic layer and the fluorine resin tube.

Then, the base layer covered with the elastic layer and the surface layer was loaded into an electric furnace set at a temperature of 200° C., and was heated for 1 hour so that the adhesive was cured to bond the fluorine resin tube onto the elastic layer, followed by the cutting of both ends of the resultant. Thus, a preliminary fixing belt having a width of 343 mm was obtained.

Contact Impregnation of Fluorine Oil

The perfluoropolyether (PFPE-1) was loaded into a borosilicate glass-made measuring cylinder. A heating wire covered with a heat-insulating material was wound around the entirety of the measuring cylinder to heat the cylinder so that the temperature of the PFPE became 285° C. The produced preliminary fixing belt was mounted on a dipping apparatus, and the entirety of the fixing belt was immersed in the heated PFPE. Five minutes after that, the preliminary fixing belt was removed. After that, the preliminary fixing belt was immersed in a measuring cylinder separately prepared fluorine-based solvent (product name: Novec 7300, manufactured by 3M Company), and an excessive amount of the PFPE adhering to the surface of the fixing belt was removed, followed by the drying of the fluorine-based solvent. Thus, a fixing belt No. 1 according to this Example was produced. Two sets of the fixing belts No. 1 were prepared so as to be subjected to evaluations to be described later.

In addition, a photograph obtained by observing the first surface of the fixing belt No. 1 with a SEM is shown in FIG. 1. A manner in which the molecules of the PFPE aggregated could not be observed, and hence it was suggested that the PFA and the PFPE were compatible with each other.

<Evaluation>

Three sets of measurement samples to be used in an evaluation 1 to an evaluation 3 were prepared as described below.

Preparation of Measurement Sample

A laminate (diameter: 10 mm) of the elastic layer and the surface layer was cut out of the fixing belt No. 1. Next, the laminate was immersed in a silicone resin-dissolving agent (product name: e SOLVE 21RS, manufactured by Kaneko Chemical Co., Ltd.) so that the silicone rubber in the elastic layer was dissolved. Thus, the elastic layer was removed from the laminate. Thus, a measurement sample including the total thickness portion of the surface layer was prepared.

Evaluation 1; Measurement of Fluorine Oil Adhesion Amounts P11, P12, and P21

The first surface of the measurement sample opposite to a side facing the base layer was cleaned. That is, a nonwoven fabric impregnated with ethanol was placed on the first surface, and a load of 20 kPa was applied onto the nonwoven fabric and reciprocated 10 times at the position. Subsequently, a nonwoven fabric impregnated with toluene was placed on the surface, and a load of 20 kPa was applied onto the nonwoven fabric and reciprocated 10 times at the position.

Next, a quartz crystal was mounted on the stage portion of a tack tester (product name: TAC-1000, manufactured by RHESCA Co., Ltd.). Meanwhile, the measurement sample was mounted on the probe portion of the tack tester so that the first surface faced the quartz crystal. Next, the probe was brought closer to the stage portion to press the first surface of the measurement sample against the quartz crystal. Pressing conditions are as described below.

Pressure: 0.4 MPa,
Pressing time: 50 msec,
Pressing amount constant mode,
Pressing and lifting speed: 1.0 mm/sec,
Probe set temperature: 180° C.

"6A202PN" having a fundamental frequency of around 6 MHz (product name, manufactured by Piezo Parts Co., Ltd.) was used as the quartz crystal. As the measurement of frequency characteristics before and after the adhesion, a change in series resonance frequency Fs, and a change in frequency Fw representing the loss of a vibrational energy, before and after the pressing were measured with a QCM-D intermolecular interaction analysis system (Biolin Scientific AB). The adhesion amount P11 of the fluorine oil per unit area (1 cm$^2$) of the quartz crystal was calculated from the equation (a).

Immediately after the completion of the pressing treatment, the measurement sample was removed from the probe, and the first surface was cleaned in the same manner as that described above. Next, the measurement sample was placed in an environment having a temperature of 180° C. for 120 sec. After that, the measurement sample was mounted on the probe again, and was pressed against the quartz crystal under the same pressing conditions as those described above. Then, a change in series resonance frequency Fs and a change in frequency Fw representing the loss of a vibrational energy were measured, and the adhesion amount P12 of the fluorine oil per unit area (1 cm$^2$) of the quartz crystal was calculated from the equation (a).

Evaluation 2; Fluorine Oil Content of Surface Layer

The first surface and second surface of anther measurement sample were cleaned. Next, the measurement sample was subjected to measurement with a thermogravimetric analyzer (TGA) under the following conditions, and the content (mass %) of the fluorine oil with respect to the surface layer was calculated.

Apparatus: TGA 851 (manufactured by METTLER TOLEDO);
Atmosphere: In air;
Temperature: 425° C.

A linear least-squares approximation equation was determined from a region where a gradient was constant and only the amount of the PFA reduced (specifically, a region corresponding to a measurement time of 3,000 sec or more) in a measurement time-weight loss ratio profile obtained by the thermogravimetry. The intercept of the linear least-squares approximation equation was adopted as the amount (mass %) of the PFA, and the content (mass %) of the PFPE was calculated from the equation "content of PFPE=100-amount of PFA".

Evaluation 3; Relative Ratio Between PFPE Amounts on Outermost Surface Side and Elastic Layer Side of Surface Layer in Thickness Direction The first surface and second surface of still another measurement sample were cleaned. Next, the amounts of the PFPE on the first surface side and second surface side of the measurement sample were measured with an infrared spectrometer (product name: Frontier MIRNIR, manufactured by PerkinElmer) by an ATR method, and a relative ratio between the amounts of the PFPE (hereinafter referred to as "PFPE relative amount ratio") was calculated.

Specifically, a peak ratio was calculated from the respective profiles obtained through the infrared spectroscopic analysis by dividing the height of a peak appearing only in the PFPE (Krytox type: 986 cm$^{-1}$, Demnum type: 1,010 cm$^{-1}$, Fomblin type: 1,052 cm$^{-3}$) by the height of a peak appearing only in the PFA (1,146 cm$^{-1}$). Next, the PFPE relative amount ratio was calculated by dividing a peak ratio calculated from the measurement results of the second surface side by a peak ratio calculated from the measurement results of the first surface side.

Evaluation 4; Evaluation of Presence or Absence of Toner Offset

The fixing belt No. 1 was mounted on an electrophotographic image-forming apparatus (product name: imageRUNNER-ADVANCE C5051; manufactured by Canon Inc.) in which the angle of a paper-separating claw had been adjusted.

Then, an image-forming process in which a cyan solid image measuring 10 cm by 10 cm was formed on A4 size paper (manufactured by International Paper, basis weight: 75 g/m$^2$) was performed. A fixation temperature was set to 180° C., and a paper-conveying velocity was set to 300 mm/sec.

Then, at the time point when the number of sheets each having formed thereon the cyan solid image reached 1, 100, or 100,000, 1 sheet of A4 size plain thin paper (product name: CS-520, basis weight: 52 g/m$^2$, manufactured by Canon Inc.) was passed, and a cyan solid image measuring 10 cm by 10 cm was formed thereon. The solid image formed on the plain thin paper was observed visually and with a microscope, and was evaluated by the following criteria.

Evaluation Criteria

Rank A: None of a toner offset and toner missing occurs.
Rank B: A toner offset and toner missing are slightly observed.
Rank C: Both of a toner offset and toner missing are observed.
Rank D: The plain thin paper was bonded to the fixing belt.

Evaluation 5; Measurement of Surface Free Energy

In the evaluation 4, the surface free energy of the outer surface of the fixing belt No. 1 immediately before the formation of the solid image on the plan thin paper was calculated by the "Kitazaki-Hata method" described in "Journal of the Adhesion Society of Japan", The Adhesion Society of Japan, 1972, Vol. 8, No. 3, p. 131 to 141. Specifically, the contact angles of the outer surface of the fixing belt No. 1 with respect to water, n-hexadecane, and diiodomethane were measured (measurement environment: a temperature of 23° C. and a relative humidity of 55%).

Next, the surface free energy was determined from "extended Fowkes' equation" by using the measurement results of the respective contact angles in accordance with the description of "2. Extension of Forks Equation" to "3. Surface Tension of Polymer Solid and its Components" on page 131 of "Journal of the Adhesion Society of Japan", The Adhesion Society of Japan, 1972, Vol. 8, No. 3, p. 131 to 141.

A contact angle meter (product name: DM-501, manufactured by Kyowa Interface Science Co., Ltd.) was used in the contact angle measurement, and analysis software (product name: FAMAS, manufactured by Kyowa Interface Science Co., Ltd.) was used in the surface free energy analysis.

Examples 2 to 18

Fixing belts Nos. 2 to 18 according to Examples were each produced in the same manner as in Example 1 except that the kind of the fluorine resin to be used in the surface layer, the kind of the fluorine oil, and the temperature of the fluorine oil at the time of its contact with the preliminary fixing belt were changed as shown in Table 2.

Example 19

A fixing belt No. 19 was produced in the same manner as in Example 1 except that in Example 1, the time period for which the fixing member and the fluorine oil were brought into contact with each other was set to 1 minute, and the fixing belt was subjected to the evaluation 1 to the evaluation 5.

Example 20

A fixing belt No. 20 was produced in the same manner as in Example 1 except that in Example 1, a solution obtained by diluting the PFPE with a fluorine-based solvent (product name: Novec 7300, manufactured by 3M Company) was applied to the surface of the fixing member by spray coating, and then the resultant was loaded into a drying furnace and heated at 285° C. for 5 minutes.

Comparative Example 1

A preliminary fixing belt was produced by the method described in Example 1, and the preliminary fixing belt was adopted as a fixing belt No. C-1 according to this Comparative Example.

Comparative Example 2

Sodium naphthalene (product name: TETRA-ETCH, manufactured by Junkosha Inc.) was applied to the outer surface of the fixing belt No. C-1 to chemically hydrophilize the outer surface.
Next, a PFPE having an alkoxysilane-modified molecular terminal (product name: OPTOOL DSX, manufactured by Daikin Industries, Ltd.) was dissolved in a fluorine-based solvent (product name: Novec 7300, manufactured by 3M Company). The solution was applied to the hydrophilized outer surface, and was then baked in a drying furnace heated to 120° C. for 1 hour to chemically fix the PFPE to the outer surface. After that, the outer surface having chemically fixed thereto the PFPE was washed with the fluorine-base solvent. Thus, a fixing belt No. C-2 according to this Comparative Example was produced.

Comparative Example 3

A fixing belt No. C-3 was produced in the same manner as in Example 1 except that the temperature of the fluorine oil to be brought into contact with the outer surface of the preliminary fixing belt was set to 210° C.

Comparative Example 4

A base layer and an elastic layer were produced by the methods described in Example 1. The surface of the elastic layer was treated with excimer UV, and then a primer (product name: EK-1909S21L, manufactured by Daikin Industries, Ltd.) was uniformly applied thereto by spray coating so as to have a thickness of 2 µm, followed by drying.

Next, two spray guns were prepared. One of the spray guns was filled with an aqueous dispersion paint of PFA particles (product name: AW-5000L, manufactured by Daikin Industries, Ltd., melting point: 300° C.). The other spray gun was filled with a solution obtained by dissolving the PFPE-1 in a fluorine-based solvent (product name: Novec 7300, manufactured by 3M Company). Then, the aqueous dispersion paint of the PFA particles and the PFPE were applied to the surface of the elastic layer with those spray guns to form a 20-micrometer thick coating film containing the PFA particles and the PFPE. At this time, the amounts of the paint and the solution to be applied from the spray guns were adjusted so that the content of the PFPE-1 in the coating film became 2.0 wt %.

Figure 2:
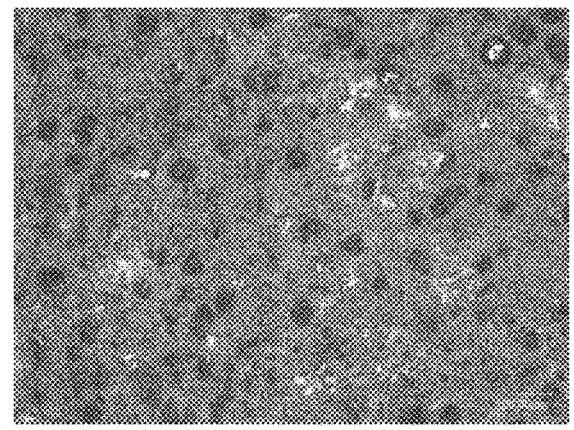
FIG. 2 is an image obtained by observing the surface of a fixing member described in Comparative Example 4.

Next, the coating film was heated at a temperature of 350° C. for 15 minutes so that the PFA particles in the coating film were melted to form a surface layer. Thus, a fixing belt No. C-4 according to Comparative Example 4 was obtained. A photograph obtained by observing the outermost surface side of the surface layer with a SEM is shown in FIG. 2. A manner in which the molecules of the PFPE aggregate can be observed, and hence it is found that the PFA and the PFPE are not compatible with each other.

The fixing belts Nos. 2 to 20 and the fixing belts Nos. C-1 to C-4 were subjected to the evaluation 1 to the evaluation 5. The evaluation results of the fixing belts Nos. 1 to 20 and the fixing belts Nos. C-1 to C-4 are shown in Table 2 and Table 3.

TABLE 2

| | Fluorine resin | | | Fluorine oil | | | | | | |
|---|---|---|---|---|---|---|---|---|---|---|
| | Kind of material | Melting point [° C.] | Thickness [µm] | Kind of material | Temperature at time of contact [° C.] | Fluorine oil content [mass %] | P11 [×10² ng] | P12 [×10² ng] | P12/P11 | P21 [×10² ng] | Relative ratio between PFPE amounts |
| Example 1 | PFA-1 | 296 | 20 | PFPE-1 | 285 | 8.5 | 30 | 24.3 | 0.81 | 51 | 1.62 |
| Example 2 | PFA-1 | 296 | 20 | PFPE-1 | 250 | 1.4 | 1.5 | 0.83 | 0.55 | 2.7 | 1.51 |
| Example 3 | PFA-1 | 296 | 20 | PFPE-1 | 265 | 5.1 | 14 | 11 | 0.80 | 25 | 1.65 |
| Example 4 | PFA-1 | 296 | 20 | PFPE-1 | 293 | 10 | 41 | 34 | 0.82 | 70 | 1.59 |
| Example 5 | PFA-1 | 296 | 20 | PFPE-1 | 310 | 14 | 25 | 23 | 0.93 | 45 | 1.64 |
| Example 6 | PFA-1 | 296 | 20 | PFPE-1 | 345 | 20 | 49 | 46 | 0.94 | 88 | 1.62 |
| Example 7 | PFA-1 | 296 | 20 | PFPE-2 | 345 | 24 | 94 | 91 | 0.97 | 146 | 1.61 |
| Example 8 | PFA-1 | 296 | 40 | PFPE-1 | 285 | 7.4 | 24 | 21 | 0.88 | 43 | 1.65 |
| Example 9 | PFA-1 | 296 | 20 | PFPE-3 | 285 | 4.9 | 35 | 38 | 1.09 | 54 | 1.45 |
| Example 10 | PFA-1 | 296 | 20 | PFPE-4 | 285 | 8.7 | 28 | 24 | 0.86 | 42 | 1.62 |
| Example 11 | PFA-1 | 296 | 20 | PFPE-5 | 285 | 8.1 | 21 | 18 | 0.84 | 31 | 1.61 |
| Example 12 | PFA-1 | 296 | 20 | PFPE-6 | 285 | 7.6 | 19 | 15 | 0.80 | 29 | 1.60 |
| Example 13 | PFA-2 | 308 | 20 | PFPE-1 | 285 | 4.7 | 16 | 14 | 0.87 | 27 | 1.65 |

TABLE 2-continued

| | Fluorine resin | | | Fluorine oil | | | | | | |
|---|---|---|---|---|---|---|---|---|---|---|
| | Kind of material | Melting point [° C.] | Thickness [μm] | Kind of material | Temperature at time of contact [° C.] | Fluorine oil content [mass %] | P11 [×10² ng] | P12 [×10² ng] | P12/P11 | P21 [×10² ng] | Relative ratio between PFPE amounts |
| Example 14 | PFA-2 | 308 | 20 | PFPE-1 | 315 | 11 | 14 | 12 | 0.83 | 24 | 1.66 |
| Example 15 | PFA-2 | 308 | 20 | PFPE-5 | 285 | 4.2 | 13 | 11 | 0.86 | 23 | 1.67 |
| Example 16 | PFA-2 | 308 | 20 | PFPE-6 | 285 | 4.1 | 10 | 8.5 | 0.85 | 18 | 1.61 |
| Example 17 | PFA-3 | 291 | 20 | PFPE-1 | 285 | 7.1 | 25 | 22 | 0.89 | 42 | 1.66 |
| Example 18 | PFA-4 | 305 | 20 | PFPE-1 | 285 | 5.1 | 19 | 16 | 0.86 | 30 | 1.63 |
| Example 19 | PFA-1 | 296 | 20 | PFPE-1 | 285 | 7.9 | 28 | 24 | 0.85 | 50 | 1.61 |
| Example 20 | PFA-1 | 296 | 20 | PFPE-1 | 285 | 8.3 | 31 | 26 | 0.85 | 53 | 1.62 |
| Comparative Example 1 | PFA-1 | 296 | 20 | — | — | — | — | — | — | — | — |
| Comparative Example 2 | PFA-1 | 296 | 20 | optool DSX | — | — | 0.20 | 0.20 | 1.0 | — | — |
| Comparative Example 3 | PFA-1 | 296 | 20 | PFPE-1 | 210 | 0.95 | 0.92 | 0.44 | 0.48 | 0.51 | 0.55 |
| Comparative Example 4 | PFA-5 | 300 | 20 | PFPE-1 | — | 2.0 | 14 | 6.6 | 0.47 | 5.8 | 0.43 |

The results obtained by subjecting the fixing members produced in Examples 1 to 20 and Comparative Examples 1 to 4 to the evaluation 4 and the evaluation 5 are shown in Table 3.

TABLE 3

| | Surface free energy [mJ/m²] | | | Toner offset | | |
|---|---|---|---|---|---|---|
| | Before paper passing | After passing of 100 sheets | After passing of 100,000 sheets | After passing of 1 sheet | After passing of 100 sheets | After passing of 100,000 sheets |
| Example 1 | 13.8 | 13.8 | 13.8 | A | A | A |
| Example 2 | 14.4 | 14.7 | 14.8 | A | B | B |
| Example 3 | 13.9 | 14.0 | 14.2 | A | A | A |
| Example 4 | 13.9 | 13.8 | 14.1 | A | A | A |
| Example 5 | 13.8 | 13.8 | 13.9 | A | A | A |
| Example 6 | 13.7 | 13.7 | 13.6 | A | A | A |
| Example 7 | 13.6 | 13.5 | 13.5 | A | A | A |
| Example 8 | 13.5 | 13.6 | 13.7 | A | A | A |
| Example 9 | 13.7 | 13.9 | 14.6 | A | A | B |
| Example 10 | 13.6 | 13.5 | 13.5 | A | A | A |
| Example 11 | 13.5 | 13.5 | 13.5 | A | A | A |
| Example 12 | 13.8 | 13.7 | 13.7 | A | A | A |
| Example 13 | 13.7 | 13.8 | 13.9 | A | A | A |
| Example 14 | 13.9 | 13.9 | 14.0 | A | A | A |
| Example 15 | 13.8 | 13.9 | 13.9 | A | A | A |
| Example 16 | 13.6 | 13.7 | 13.8 | A | A | A |
| Example 17 | 13.7 | 13.8 | 13.7 | A | A | A |
| Example 18 | 13.5 | 13.7 | 13.8 | A | A | A |
| Example 19 | 13.7 | 13.8 | 13.9 | A | A | A |
| Example 20 | 13.7 | 13.8 | 13.9 | A | A | A |
| Comparative Example 1 | 17.6 | 17.7 | 18.1 | D | D | D |
| Comparative Example 2 | 13.9 | 14.8 | 17.5 | A | B | D |
| Comparative Example 3 | 14.6 | 16.2 | 17.3 | B | C | C |
| Comparative Example 4 | 13.6 | 14.8 | 17.5 | A | B | D |

Table 3 showed that the fixing member according to this aspect was able to maintain excellent toner releasability even when used for a long time period, and as a result, a high-quality electrophotographic image was able to be formed.

The present disclosure is not limited to the embodiments described above, and various changes and modifications may be made without departing from the spirit and scope of the present disclosure. The following claims are appended hereto in order to make the scope of the present disclosure public.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A fixing member for electrophotography comprising in stated order in a thickness direction thereof:
   a base layer;
   an elastic layer; and
   a surface layer on the elastic layer,
   wherein the elastic layer contains a silicone rubber,
   wherein the surface layer is constituted by a single layer,
   wherein the surface layer contains a fluorine resin and a fluorine oil having a perfluoropolyether structure, and
   wherein the fixing member satisfies a requirement (i) and a requirement (ii):
   (i) as for a measurement sample taken from the fixing member and including a total thickness portion of the surface layer, when subjecting to a treatment including cleaning a predetermined position on a first surface which is an opposite side to a side facing the base layer, and pressing a detection surface of a quartz crystal microbalance (QCM) sensor against the position at a pressure of 0.4 MPa and a temperature of 180° C. for 50 msec, a mass P11 of an adhered substance including the fluorine oil having the perfluoropolyether structure, adhered in a unit area (1 cm$^2$) of the detection surface, is $1.0 \times 10^2$ ng to $1.0 \times 10^4$ ng; and
   (ii) as for the measurement sample subjected to the treatment defined in the requirement (i), when subjecting to a treatment including, after cleaning of the position, placing the measurement sample in an environment of a temperature of 180° C. for 120 sec, and then pressing the detection surface of the quartz crystal microbalance (QCM) sensor against the position at a pressure of 0.4 MPa and a temperature of 180° C. for 50 msec, a mass P12 of an adhered substance including the fluorine oil having the perfluoropolyether structure, adhered in the unit area (1 cm$^2$) of the detection surface, is 0.5×P11 to and 1.2×P11.

2. A fixing member for electrophotography comprising in stated order in a thickness direction thereof:
   a base layer;
   an elastic layer; and
   a surface layer on the elastic layer,
   wherein the elastic layer contains a silicone rubber,
   wherein the surface layer is constituted by a single layer,
   wherein the surface layer contains a fluorine resin and a fluorine oil having a perfluoropolyether structure,
   wherein as for a measurement sample taken from the fixing member and including a total thickness portion of the surface layer,
   when pressing a detection surface of a quartz crystal microbalance (QCM) sensor against a first surface which is an opposite side to a side facing the base layer at a pressure of 0.4 MPa and a temperature of 180° C. for 50 msec, a mass of an adhered substance including the fluorine oil having the perfluoropolyether structure, adhered in a unit area (1 cm$^2$) of the detection surface, is defined as P11 (ng), and
   when pressing the detection surface of the quartz crystal microbalance (QCM) sensor against a second surface which is the side facing the base layer of the measurement sample at a pressure of 0.4 MPa and a temperature of 180° C. for 50 msec, a mass of an adhered substance including the fluorine oil having the perfluoropolyether structure, adhered in the unit area (1 cm$^2$) of the detection surface is defined as P21 (ng):
   $P21 > P11$.

3. The fixing member according to claim 1, wherein a content of the fluorine oil in the surface layer is 1.0 mass % to 25 mass % of the surface layer.

4. The fixing member according to claim 1, wherein the P11 is $1.0 \times 10^2$ ng to $5.0 \times 10^3$ ng.

5. The fixing member according to claim 1, wherein the fluorine resin is a tetrafluoroethylene-perfluoroalkyl vinyl ether copolymer (PFA).

6. The fixing member according to claim 1, wherein the surface layer has a thickness of 5.0 μm to 50 μm.

7. The fixing member according to claim 1, wherein the fluorine oil is a perfluoropolyether.

8. The fixing member according to claim 7, wherein the perfluoropolyether has a chemical structure represented by structural formula (1):

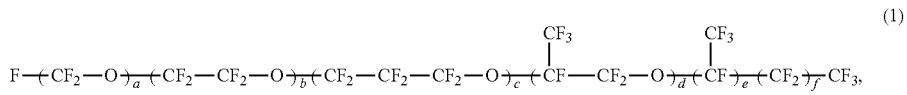

wherein, in the structural formula (1), "a", "b", "c", "d", "e", and "f" each independently represents 0 or a positive integer, and satisfy 1≤a+b+c+d+e+f≤600, and at least one of "a", "b", "c", or "d" represents a positive integer.

9. The fixing member according to claim 8, wherein the perfluoropolyether has at least one chemical structure selected from the group consisting of structural formulae (2) to (4):

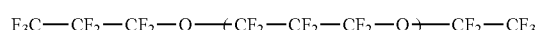

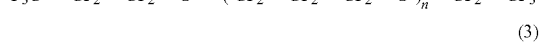

wherein, in the structural formulae (2) to (4), "m" and "n" each independently represents an integer of 1 or more.

10. The fixing member according to claim 9, wherein the perfluoropolyether has a chemical structure represented by the formula (3), the P11 is $1.0 \times 10^2$ ng to $5.0 \times 10^3$ ng, and a content of the perfluoropolyether in the surface layer is 1.0 mass % to 25 mass % of the surface layer.

11. The fixing member according to claim 1, wherein the fixing member is a fixing belt having an endless belt shape.

12. A fixing device comprising:
   a fixing member; and
   heating unit for heating the fixing member,
   wherein the fixing member comprises in stated order in a thickness direction thereof:

a base layer;

an elastic layer; and a surface layer on the elastic layer, wherein the elastic layer contains a silicone rubber, wherein the surface layer is constituted by a single layer, and wherein the surface layer contains a fluorine resin and a fluorine oil having a perfluoropolyether structure, and wherein the fixing member satisfies a requirement (i) and a requirement (ii):

(i) as for a measurement sample taken from the fixing member and including a total thickness portion of the surface layer, when subjecting to a treatment including cleaning a predetermined position on a first surface which is an opposite side to a side facing the base layer, and pressing a detection surface of a quartz crystal microbalance (QCM) sensor against the position at a pressure of 0.4 MPa and a temperature of 180° C. for 50 msec, a mass P11 of an adhered substance including the fluorine oil having the perfluoropolyether structure, adhered in a unit area (1 cm$^2$) of the detection surface, is $1.0 \times 10^2$ ng to $1.0 \times 10^4$ ng; and (ii) as for the measurement sample subjected to the treatment defined in the requirement (i), when subjecting to a treatment including, after cleaning of the position, placing the measurement sample in an environment of a temperature of 180° C. for 120 sec, and then pressing the detection surface of the quartz crystal microbalance (QCM) sensor against the position at a pressure of 0.4 MPa and a temperature of 180° C. for 50 msec, a mass P12 of an adhered substance including the fluorine oil having the perfluoropolyether structure, adhered in the unit area (1 cm$^2$) of the detection surface, is 0.5×P11 to 1.2×P11.

13. The fixing device according to claim 12, wherein the fixing member is a fixing belt having an endless belt shape, and the heating unit is a heater arranged so as to be brought into contact with an inner peripheral surface of the fixing belt.

14. An electrophotographic image-forming apparatus comprising a fixing device, wherein the fixing device comprises:

a fixing member; and heating unit for heating the fixing member, wherein the fixing member comprises in stated order in a thickness direction thereof:

a base layer;

an elastic layer; and a surface layer on the elastic layer, wherein the elastic layer contains a silicone rubber, wherein the surface layer is constituted by a single layer, and wherein the surface layer contains a fluorine resin and a fluorine oil having a perfluoropolyether structure, and wherein the fixing member satisfies a requirement (i) and a requirement (ii):

(i) as for a measurement sample taken from the fixing member and including a total thickness portion of the surface layer, when subjecting to a treatment including cleaning a predetermined position on a first surface which is an opposite side to a side facing the base layer, and pressing a detection surface of a quartz crystal microbalance (QCM) sensor against the position at a pressure of 0.4 MPa and a temperature of 180° C. for 50 msec, a mass P11 of an adhered substance including the fluorine oil having the perfluoropolyether structure, adhered in a unit area (1 cm$^2$) of the detection surface, is $1.0 \times 10^2$ ng to $1.0 \times 10^4$ ng; and (ii) as for the measurement sample subjected to the treatment defined in the requirement (i), when subjecting to a treatment including, after cleaning of the position, placing the measurement sample in an environment of a temperature of 180° C. for 120 sec, and then pressing the detection surface of the quartz crystal microbalance (QCM) sensor against the position at a pressure of 0.4 MPa and a temperature of 180° C. for 50 msec, a mass P12 of an adhered substance including the fluorine oil having the perfluoropolyether structure, adhered in the unit area (1 cm$^2$) of the detection surface, is 0.5×P11 to 1.2×P11.

* * * * *